(12) United States Patent
Cheng

(10) Patent No.: US 6,179,514 B1
(45) Date of Patent: Jan. 30, 2001

(54) TELESCOPIC TUBE JOINT

(76) Inventor: Kun-Chia Cheng, No. 76-30, Fu-Ma St., Changhwa City (TW)

( * ) Notice: Under 35 U.S.C. 154(b), the term of this patent shall be extended for 0 days.

(21) Appl. No.: 09/321,900

(22) Filed: May 28, 1999

(51) Int. Cl.[7] .............................. F16L 37/00; F16L 27/00; B25G 3/00
(52) U.S. Cl. ...................... 403/377; 403/326; 403/109.1; 403/109.3; 403/109.7; 403/109.8; 285/902; 285/308
(58) Field of Search ..................................... 285/902, 308, 285/309, 320; 403/326, 327, 329, 377, 379.2, 109.1, 109.3, 109.7, 109.8

(56) References Cited

U.S. PATENT DOCUMENTS

| | | | |
|---|---|---|---|
| 2,090,550 | * 8/1937 | Pilblad | 285/902 |
| 2,467,842 | * 4/1949 | Marx | 285/902 |
| 2,483,395 | * 10/1949 | Benson | 285/902 |
| 5,108,066 | * 4/1992 | Lundstrom | 285/902 |
| 5,833,277 | * 11/1998 | Reinert et al. | 285/308 |

* cited by examiner

Primary Examiner—Lynne H. Browne
Assistant Examiner—Tomlyne A. Malcolm
(74) Attorney, Agent, or Firm—Heller Ehrman White & McAuliffe LLP

(57) ABSTRACT

A telescopic tube joint has a sleeve, which is adapted to securely coupling an outer tube and an inner tube, and defines a locking chamber therein. At least two locking rings are received in the locking chamber of the sleeve, the locking rings are forced apart by a biasing member between the locking rings and cause the locking rings to press on the outer wall of the inner tube to hold the inner tube in place with respect to the outer tube. When a user squeezes the locking rings, the inner tube will slide freely in the outer tube.

4 Claims, 8 Drawing Sheets

TELESCOPIC TUBE JOINT

BACKGROUND OF THE INVENTION

1. Field of the Invention

The present invention relates to an improved joint for securely connecting a pair of telescopic tubes.

2. Description of Related Art

Conventional telescopic tubes normally comprise an outer tube, an inner tube slidably received in the outer tube and joint between them to connect the inner tube and the outer tube. As shown in FIGS. 8 and 9, a compression joint between an inner tube (3) and an outer tube (4) comprises a rubber inner tube plug (5), a rubber outer tube plug (6), a stop sleeve (8) and a bolt (7) with an enlarged head (71). The inner tube plug (5) defines an offset axial threaded hole (52) and a flange (51) formed on the bottom. The diameter of the inner tube plug (5) is the same as the inside diameter of the inner tube (3), and the diameter of the flange (51) is the same as the outside diameter of the inner tube (3) so that the inner tube plug (5) is stopped by the open end of the inner tube (3). The outer tube plug (6) defines an offset axial through hole (61) corresponding to the offset screw hole (52) of the inner tube plug (5). The bolt (7) is inserted through the through hole (61) of the outer tube plug (6) and into the screw hole (52) of the inner tube plug (5), so that the outer tube plug (6) is held in place by the head (71) of the bolt (7). The stop sleeve (8) is slid onto the inner tube (3), and the inner tube plug (5) and outer tube plug (6) combination is inserted into the inner tube (3). Then the inner tube (3) with the inner tube plug (5) and outer tube plug (6) is inserted into the outer tube (4), and finally the stop sleeve (8) is fit into the open end of the outer tube (4) to prevent the inner tube (3) from falling out by the friction of the combination of the inner tube plug (5) and the outer tube plug (6) with the stop sleeve (8). When a user turns the tubes in opposite directions, the outer tube plug (6) will press against the inner wall of the outer tube (4) to securely attach the inner tube (3) to the outer tube (4). When the tubes are turned in the opposite direction, the outer tube plug (6) is released from the inner wall of the outer tube (4) and the inner tube (3) is free to slide in the outer tube (4).

However, disadvantages of the joint include:
1 the life of the outer tube plug (6) is short, as the rubber material ages quickly, becomes brittle and wears excessively after a period of time, and
2 the joint can only be used in circular tubes.

SUMMARY OF THE INVENTION

The main object of the present invention is to provide an improved joint between a pair of telescopic tubes to increase the life span of the joint, and particularly a joint that can be used with non-circular tubes.

The detailed features of the present invention will be apparent in the detailed description with appropriate reference to the accompanying drawings.

DETAILED DESCRIPTION OF PREFERRED EMBODIMENT

Figure 1:
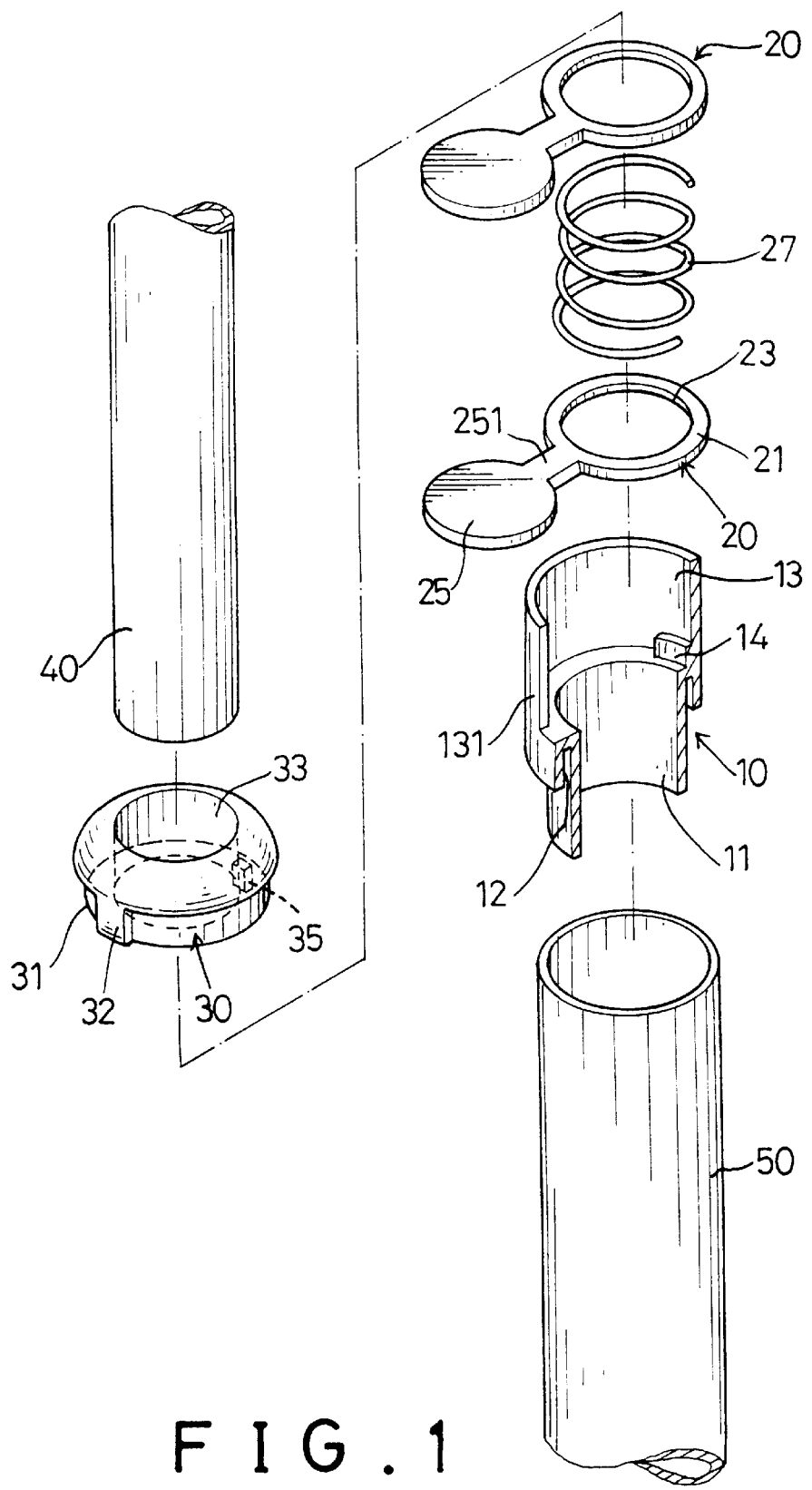
FIG. 1 is an exploded perspective view of a joint in accordance with the present invention.
Figure 2:
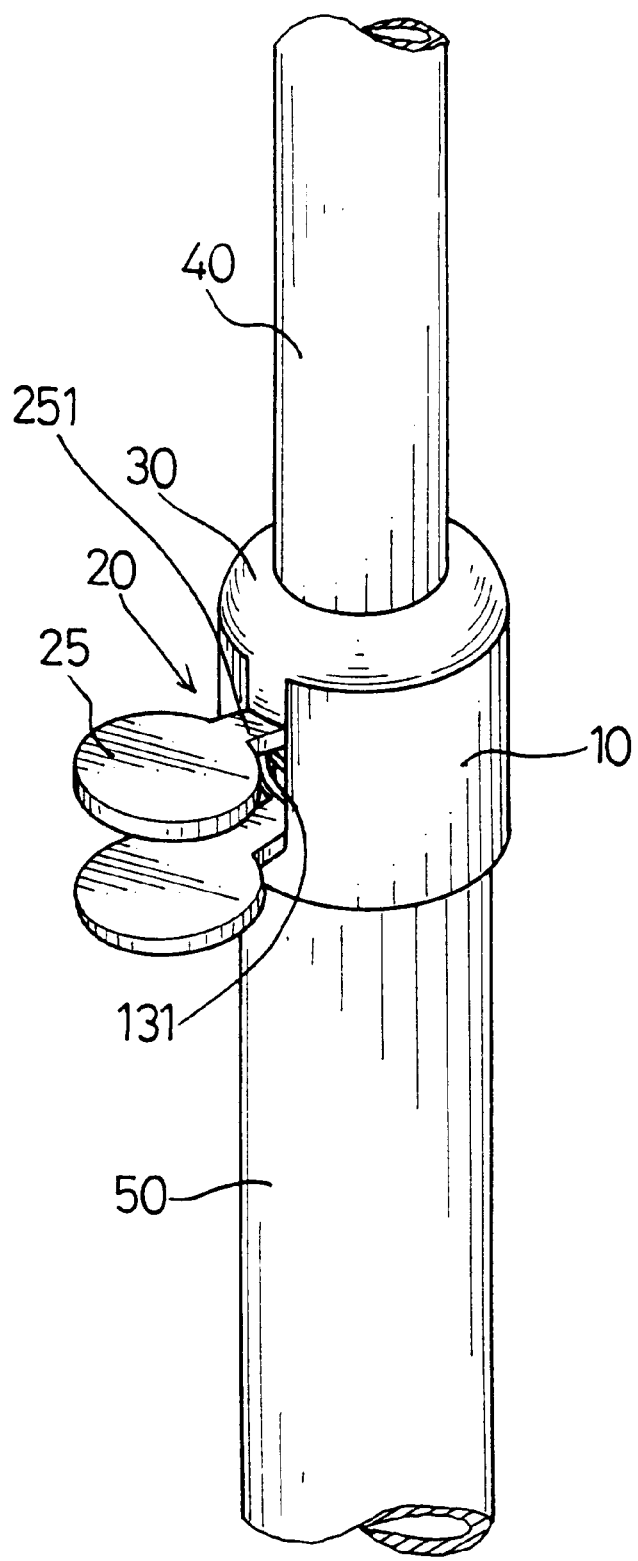
FIG. 2 is a perspective view of the joint in accordance with the present invention.

As shown in FIGS. 1 and 2, an inner tube (40) is adjustably fit into an outer tube (50) with a joint between the two tubes (40, 50), which comprises a sleeve (10), two locking rings (20) with a biasing member (27) between the two locking rings (20) and a sleeve cap (30).

The sleeve (10) is stepped with the diameter of one end larger than the other such that the small end can be press fit into the opening of the outer tube (50), and the open end of the outer tube (50) can be fixedly inserted into a longitudinal annular groove (12) formed by longitudinally extending the larger end of the sleeve (10). An inner bore (11) is defined in the sleeve (10) and has a diameter just large enough so that the inner tube (40) will slide freely. The other end of the sleeve (10) defines a locking chamber (13) with an open slot (131) communicating with the locking chamber (13). Furthermore, a ring step (14) is integrally formed on the inner wall of the sleeve (10) opposite the slot (131).

The locking ring (20) integrally forms an annular member (23) and an adjacent press tab (25) with an integral connecting rod (251) between the annular member (23) and the press tab (25). The annular member (23) of the locking ring (20) defines a hole (21) through which the inner tube (40) passes. The annular members (23) can be received in the locking chamber (13) of the sleeve (10) with the connecting rod (251) in the open slot (131).

The sleeve cap (30) defines a central hole (33) through which the inner tube (40) passes and forms a small end (31) with a key (32) integrally formed to correspond to the slot (131). The small end (31) of the sleeve cap (30) can be press fit into the locking chamber of the sleeve (10) with the key (32) fit into the open slot (131). A ring step (35) is integrally formed on the bottom of the sleeve cap (30) to correspond to the ring step (14) of the locking chamber (13).

To assemble the inner tube (40) with the outer tube (50), the open end of the outer tube (50) is inserted into the longitudinal annular groove (12) of the sleeve (10). Then, one end of the inner tube (40) is inserted through the central hole (33) of the sleeve cap (30), the hole (21) of one of the locking rings (23), the biasing member (27) and the other locking ring (23). After the end of the inner tube (40) is inserted through the inner bore (11) of the sleeve (10) and into the outer tube (50), the annular members (23) of the locking rings (20) and biasing member (27) can be installed in the locking chamber (13) of the sleeve (10) with the connecting rod (251) in the open slot (131). The sleeve cap (30) will then be inserted into the locking chamber (13) of the sleeve (10) with the key (32) fit into the open slot (131). The remaining space in the slot (131) is left for the connecting rod (251) of the locking rings (20) to move therealong.

Figure 3:
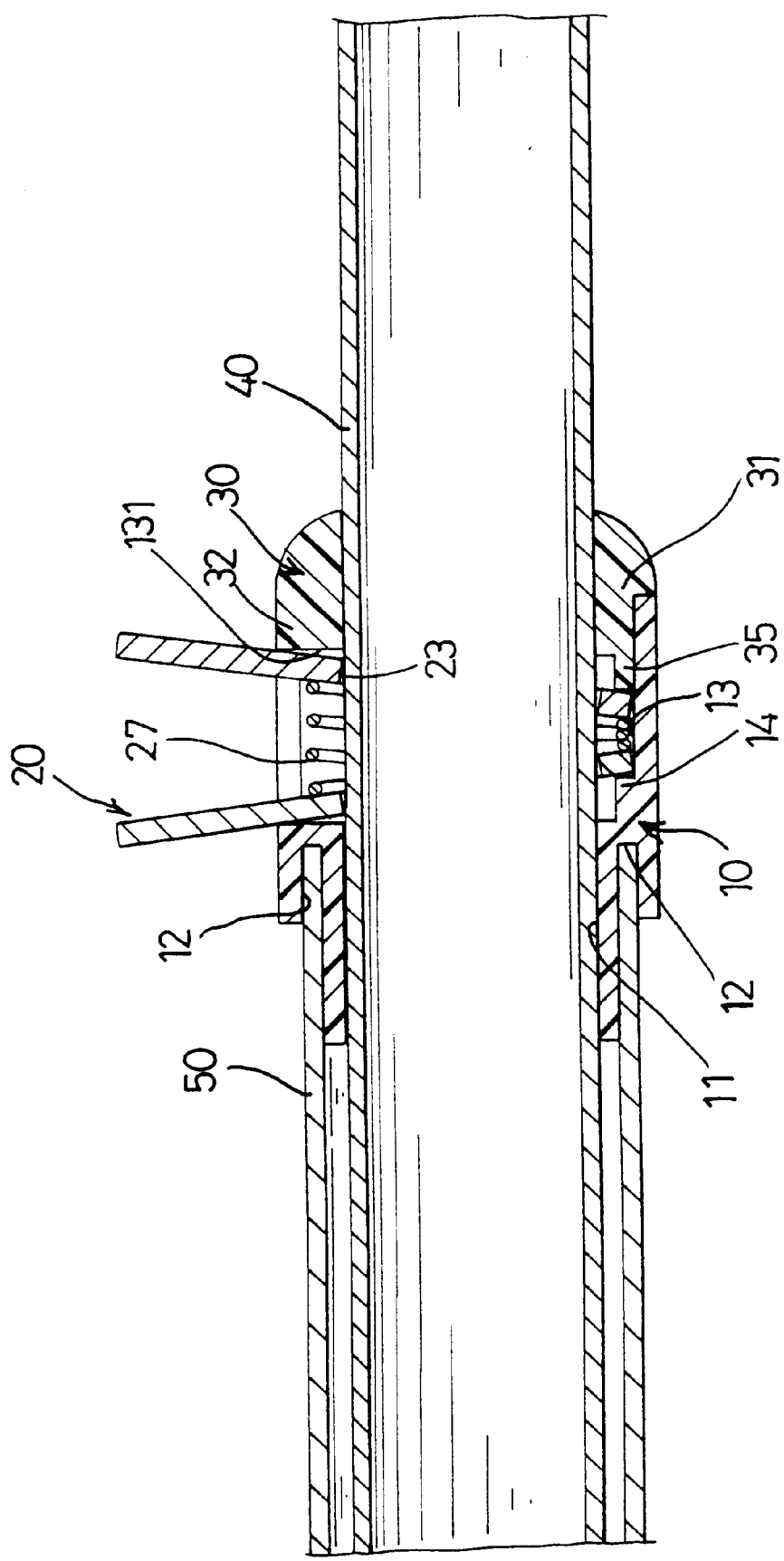
FIG. 3 is a cross sectional view of the joint in FIG. 1 showing its locked state.
Figure 4:
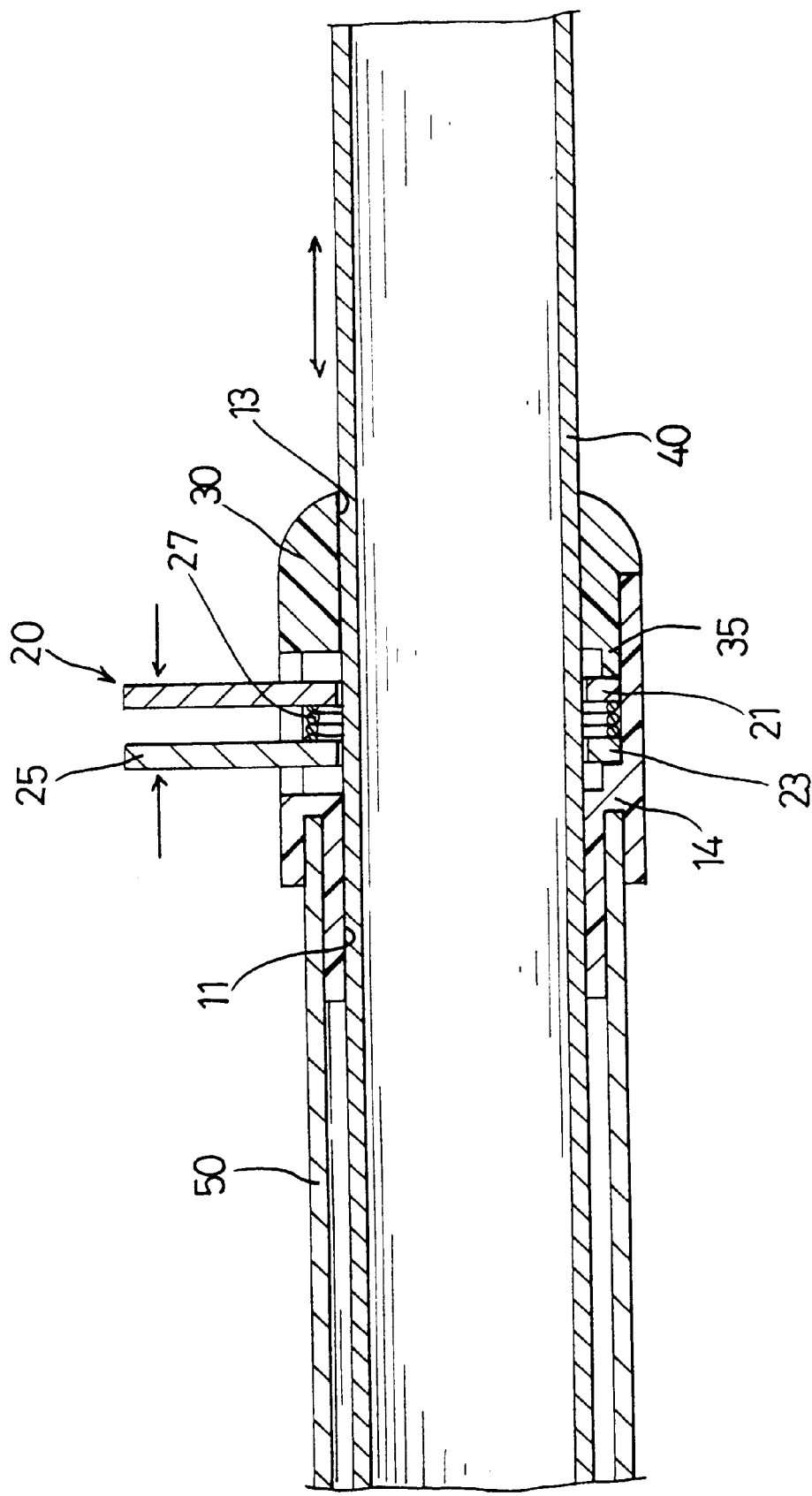
FIG. 4 is a cross sectional view of the joint in FIG. 1 showing its unlocked state.
Figure 5:
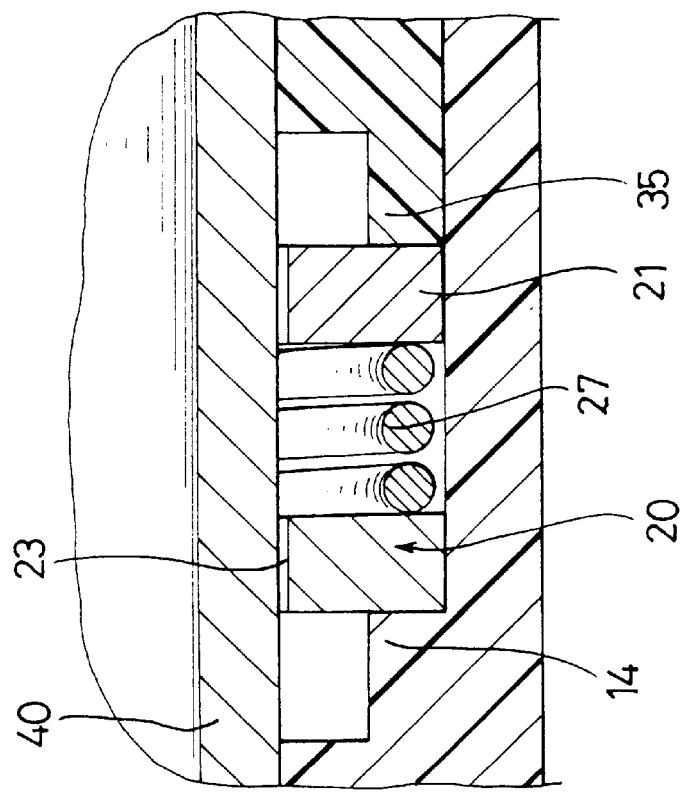
FIG. 5 is a partial enlarged cross sectional view of the joint in accordance with the present invention.
Figure 6:
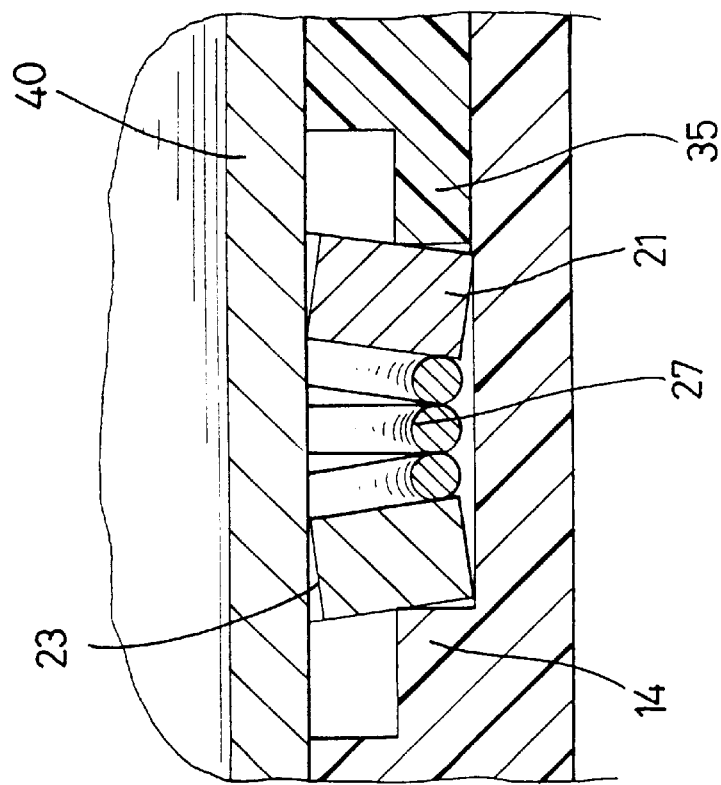
FIG. 6 is a partial enlarged cross sectional view of the joint in accordance with the present invention.

As shown in FIGS. 3 and 4 and further illustrated in FIGS. 5 and 6, because the inside segments of the annular members

(23) are held by the ring steps (14,35) and forced apart by the biasing member (27), the locking rings (20) are initially positioned at a predetermined relative angle from 13° to 17°. Therefore, at least four points of the annular members (23) contact the inner tube (40), so that the friction of the point contacts will hold the inner tube (40) in a fixed position. When a user squeezes the press tabs (25) of the locking rings (20), the two annular members (23) are pushed to be substantially parallel to the each other Such that, the inner walls of the annular member (23) are substantially parallel to the outer wall of the inner tube (40). Since the inner diameter of the hole (21) is larger than outer diameter of the inner tube (40), the inner tube (40) is free from the frictional contact with the annular members (23) and is slidable in the holes (21) of the corresponding annular members (23). When the inner tube (40) is adjusted to the desired length, the user releases the press tabs (25) to let the locking rings (20) return to their initial positions. Then the annular members (23) will abut the outer wall of the inner tube (40) and hold the inner tube (40) in place. The inner wall of the annular member (23) is preferably coated with a skid-proof coating to increase the friction between the annular members (23) and the inner tube (40).

Figure 7:
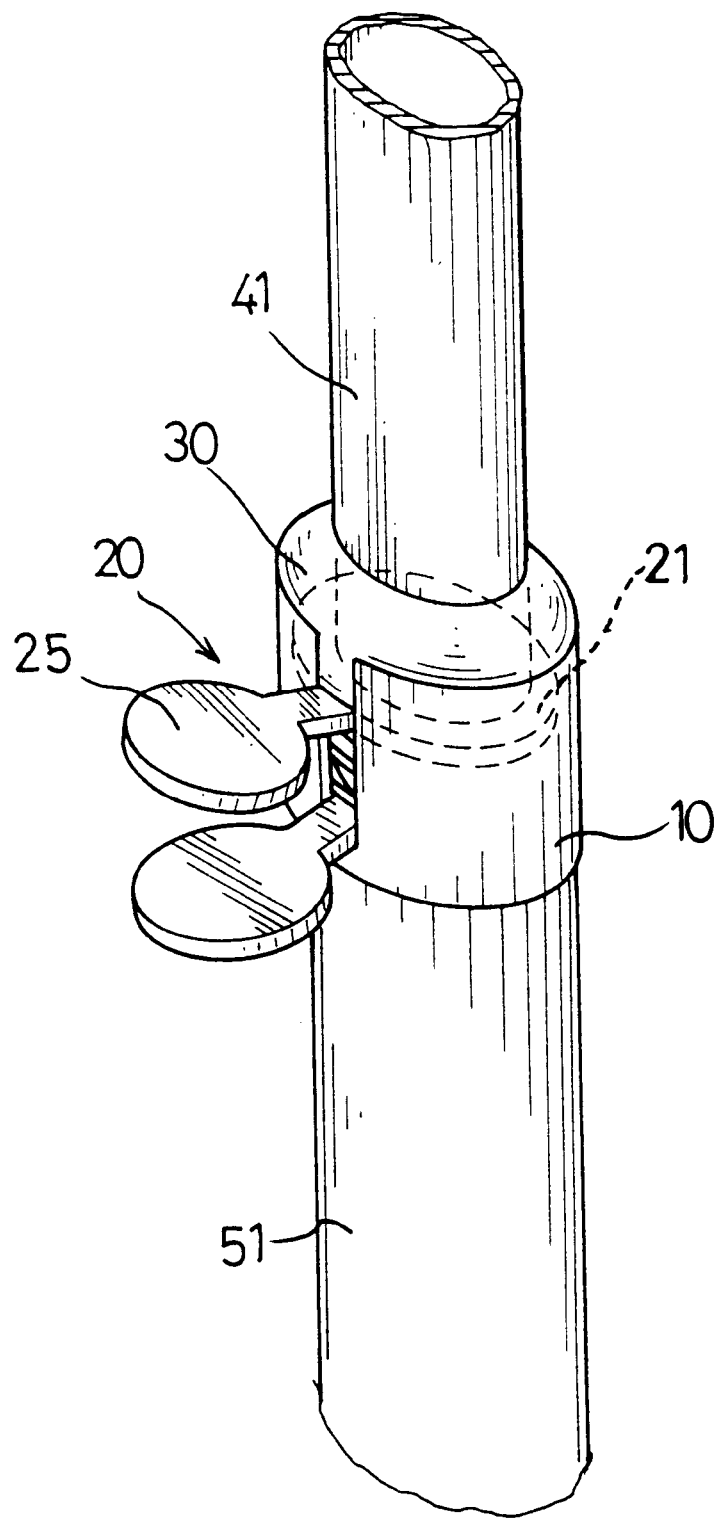
FIG. 7 is another embodiment of the joint using a pair of non-circular tubes.
Figure 8:
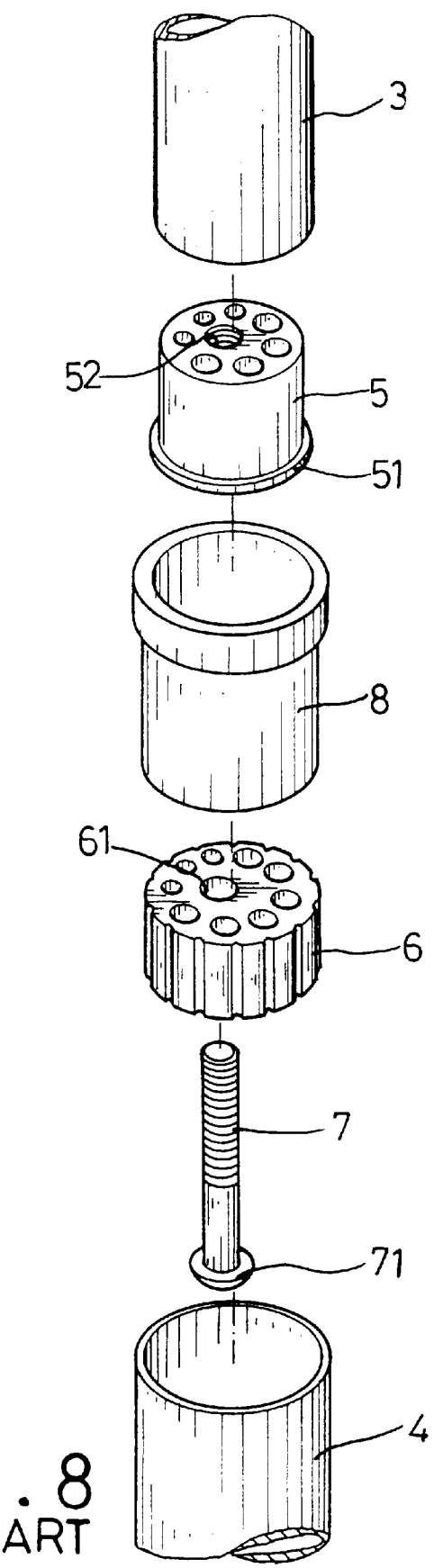
FIG. 8 is an exploded perspective view of a conventional coupling device.
Figure 9:
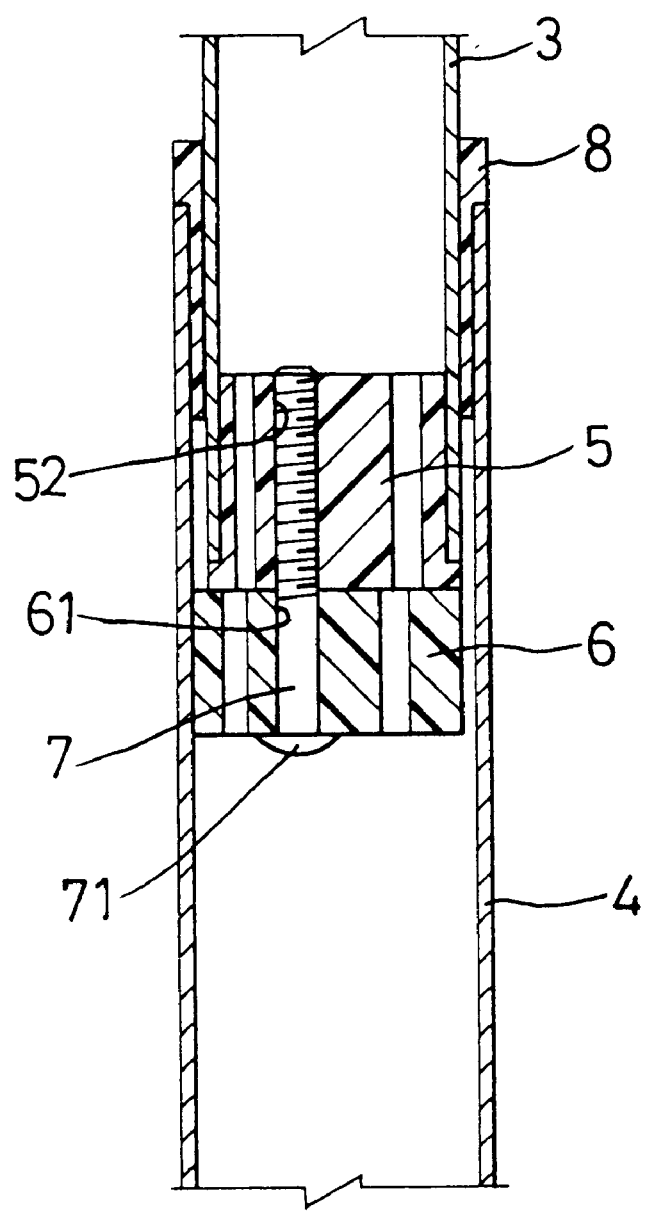
FIG. 9 is a cross sectional view of the conventional controlling device shown in FIG. 8.

As shown in FIG. 7, another embodiment of the present invention can have the tubes, locking rings and sleeve be non-circular in shape.

Although the invention has been explained in relation to its preferred embodiment, it is to be understood that many other possible modifications and variations can be made without departing from the spirit and scope of the invention as hereinafter claimed.

What is claimed is:

1. A telescopic tube joint, comprising:

a sleeve adapted to securely couple an outer tube and an inner tube, the sleeve defining a bore and a locking chamber communicating with the bore, the sleeve having an open slot in a side wall thereof for communicating with the locking chamber and a ring step formed on an inner wall thereof opposite to the open slot;

a sleeve cap connected to the sleeve and having a central hole defined therein, the sleeve cap forming a small end with a key integrally formed to correspond to the open slot of the sleeve and having a ring step on the bottom thereof corresponding to the ring step of the sleeve;

at least two locking rings, each having an annular member with a press tab connected to the annular member, each annular member being received in the locking chamber of the sleeve and defining a through hole through which the inner tube passes; and at least one biasing member provided between the annular members.

2. The telescopic tube joint of claim 1 where the press tab is connected to the annular member by a connecting rod integrally formed between the press tab and the annular member.

3. The telescopic tube joint of claim 1 where each annular member is provided with a skid-proof coating on its outside to increase friction between the annular members and the inner tube.

4. The telescopic tube joint of claim 1 where the biasing member is a spring.

* * * * *